US005134731A

United States Patent [19]

Quintile et al.

[11] Patent Number: 5,134,731

[45] Date of Patent: Aug. 4, 1992

[54] ADJUSTABLE BED HAVING ADJUSTABLE HEIGHT LEGS WITH SYNCHRONIZATION FEATURE

[75] Inventors: Mark J. Quintile, Brunswick, Ohio; Robert E. Miller, Deltona, Fla.

[73] Assignee: Invacare Corporation, Elyria, Ohio

[21] Appl. No.: 652,431

[22] Filed: Feb. 7, 1991

[51] Int. Cl.[5] .......................... A61G 7/00; F16H 27/02

[52] U.S. Cl. .......................... 5/11; 5/611; 74/424.8 R; 74/459; 74/89.15; 192/141

[58] Field of Search .................. 5/11, 63; 74/424.8 R, 74/459, 89.15; 192/141

[56] References Cited

U.S. PATENT DOCUMENTS

| | | | |
|---|---|---|---|
| 964,752 | 7/1910 | Cartwright . | |
| 2,944,436 | 7/1960 | Pickles | 74/424.8 |
| 3,277,736 | 10/1966 | Goodman | 74/459 X |
| 3,628,199 | 12/1971 | Helton | 5/63 |
| 3,733,914 | 5/1973 | Sheesley | 74/89.15 |
| 4,107,877 | 8/1978 | Lee | 49/28 |
| 4,180,187 | 12/1979 | Ben-Haim | 222/326 |
| 4,398,313 | 8/1983 | Mitchell | 5/66 |
| 4,425,674 | 1/1984 | Werner | 5/68 |
| 4,472,846 | 9/1984 | Volk, Jr. et al. | 5/69 |
| 4,499,618 | 2/1985 | Werner | 5/68 |
| 4,559,655 | 12/1985 | Peck | 5/66 |
| 4,569,242 | 2/1986 | Hu | 74/424.8 A |
| 4,672,858 | 6/1987 | Langowski | 74/424.8 R |
| 4,674,349 | 6/1987 | Vouk et al. | 74/424.8 A |
| 4,759,682 | 7/1988 | Hood | 414/537 |
| 4,846,011 | 7/1989 | Gaffney | 74/424.8 R |
| 4,867,295 | 9/1989 | Metcalf et al. | 192/141 |

FOREIGN PATENT DOCUMENTS

| | | | |
|---|---|---|---|
| 1426868 | 3/1976 | United Kingdom | 5/63 |

*Primary Examiner*—Michael F. Trettel

*Attorney, Agent, or Firm*—Fay, Sharpe, Beall, Fagan, Minnich & McKee

[57] ABSTRACT

An adjustable bed comprises a head end, a foot end, and a planar mattress portion extending therebetween. The head end and foot end feature a drive screw and nut housing assembly. Each head end and foot end features tubes which are slidingly received within the head end and foot end. The tubes are attached via a cable to the nut housing. Upon rotation of the drive screw, the nut housing rises or descends, thereby adjusting the height of the bed. The translational movement of the nut housing along the drive screw is limited by a drive screw pin at the upper and lower extremities of each drive screw. The drive screw pin selectively engages a similar slip nut pin located on a slip nut which is received within the nut housing. Frictional force between the slip nut and the nut housing is maintained by a pair of pressure plates which are compressively received within the nut housing. The compressive force between the slip nut and the nut housing is adjusted by means of a pair of set screws and springs.

14 Claims, 4 Drawing Sheets

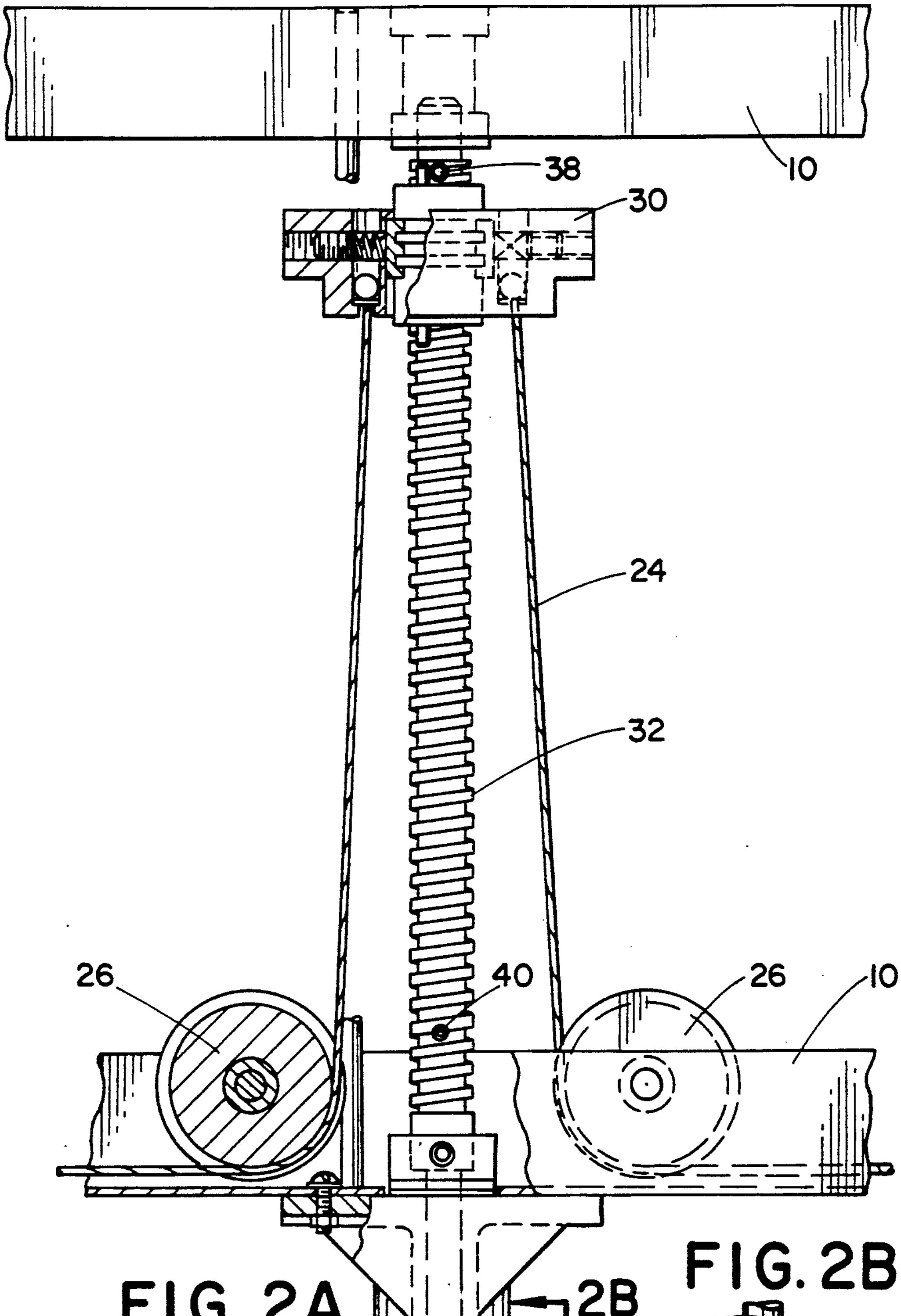
FIG. 2A
FIG. 2B
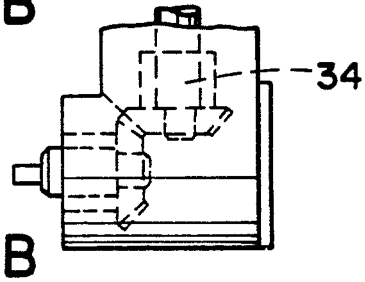

FIG. 5
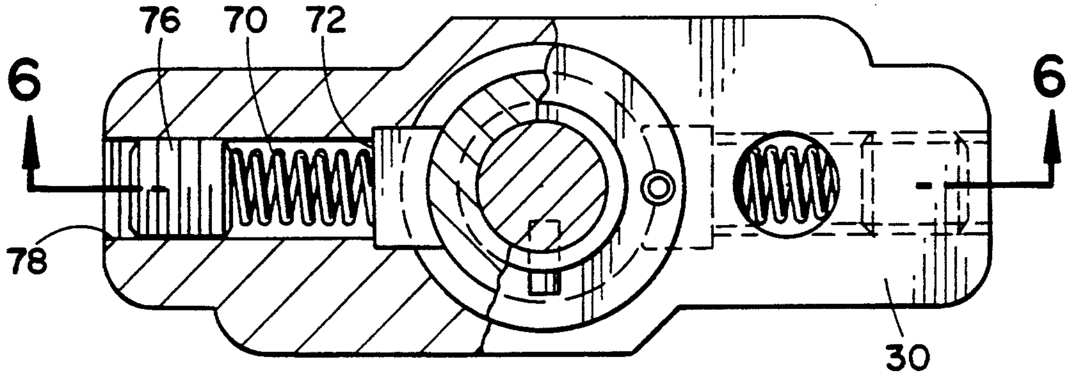
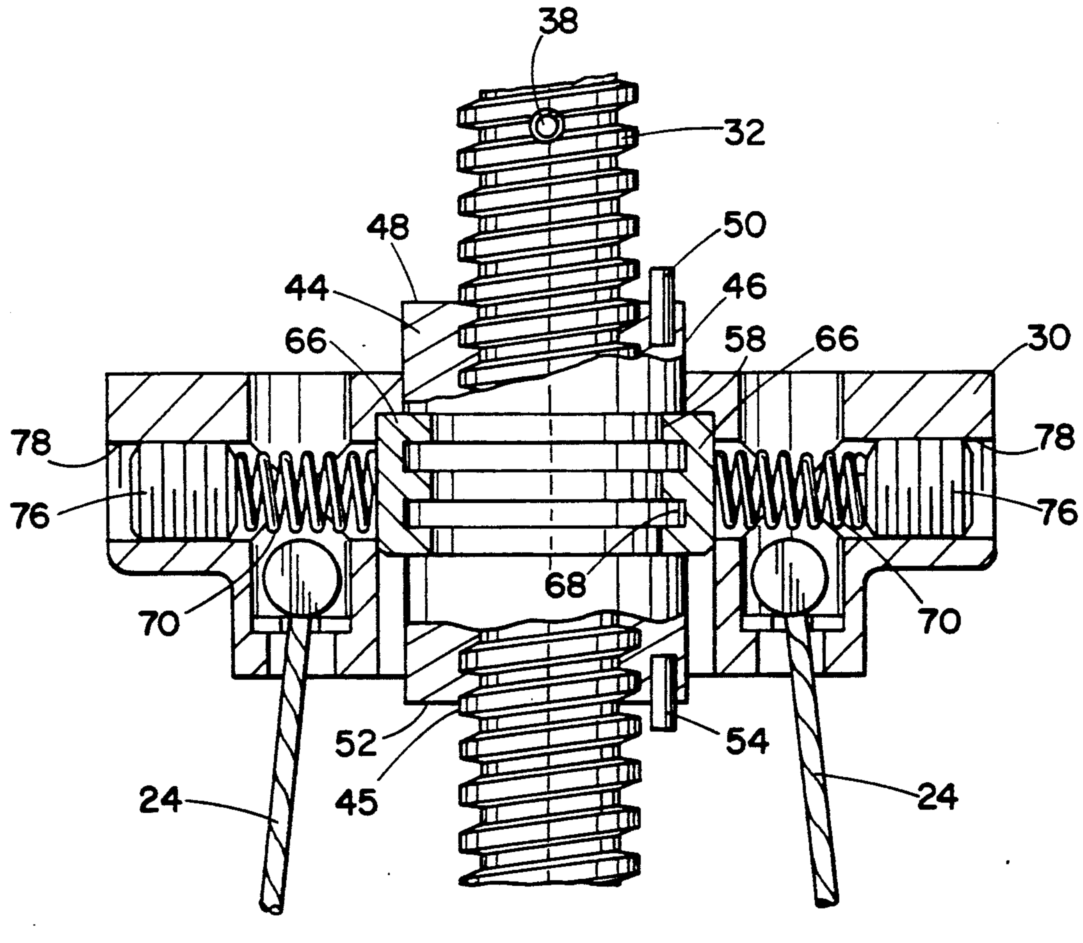
FIG. 6

ADJUSTABLE BED HAVING ADJUSTABLE HEIGHT LEGS WITH SYNCHRONIZATION FEATURE

BACKGROUND OF THE INVENTION

1. Field of Invention

This invention pertains to the art of adjustable beds, and more particularly to the art of mechanisms for synchronizing the movement of a lifting mechanism located in the head end and a similar mechanism located in the foot end.

2. Description of Related Art

It has been known in the art of adjustable beds to provide mechanisms to adjust the height of the head end and foot end. These mechanisms have incorporated drive screws, gears, screws, and pulley and cable arrangements whereby rotation of the drive screw causes movement of the mattress bearing portion of the bed.

A common problem with beds of the prior art presents itself when a drive screw mechanism within a head end is matched with a drive screw mechanism within a foot end. Often times, beds are disassembled and stored when they are not needed. When the beds are reassembled, it is common for the head end of a particular bed to be fitted with a foot end of a different bed. In some cases, the drive screw mechanism with associated nut housing and pulley arrangement is at a different height along the length of the head end drive screw than is the nut housing and pulley arrangement which is associated with the drive screw mechanism in the foot end. If these head ends and foot ends are assembled into a bed without synchronizing the relative locations of the nut housings, the following scenario often occurs. As the height of the adjustable bed is adjusted, the nut housing in the head end, for example, reaches the end of its travel before the drive screw assembly in the foot end reaches the end of its travel. As the motor continues turning to lift the foot end nut housing to the top position, the gears are stripped in the head end motor gear train.

The present invention contemplates a new, improved, and simple mechanism whereby the head ends and foot ends of different beds can be paired up without fear of stripping the gears on the associated motor gear train. The invention is simple and inexpensive yet effective in use and overcomes the foregoing difficulties and others while providing better and more advantageous overall results.

SUMMARY OF THE INVENTION

In accordance with the present invention, a new and improved adjustable home care bed having an adjustable height feature with synchronization capabilities is provided.

More particularly, in accordance with the invention, the adjustable bed includes a head end supported by head end legs and a foot end supported by foot end legs. A planar mattress portion extends between and is supported by the head end and foot end. A head end drive screw and a foot end drive screw are vertically disposed within the head end and foot end respectively. The drive screws are threaded and are selectively rotatable. Each drive screw has an upper and lower end. Each drive screw has an upper drive screw pin fixedly attached near said upper end and a lower drive screw pin fixedly attached near the lower end. An annular slip nut is associated with each of the drive screws. Each slip nut has an interior surface and an exterior surface. The interior surfaces have acme slip nut threads which operatively engage drive screw threads on the drive screws. Each of the exterior surfaces have slip nut grooves in them. The slip nuts have an upper and lower end. An upper slip nut pin is fixedly attached to each upper end of each slip nut. A lower slip nut pin is fixedly attached to each lower end of the slip nuts. A pressure plate is associated with each of the slip nuts. The pressure plates have inward and outward surfaces. The inward surfaces of the pressure plates have pressure plate grooves therein. The pressure plate grooves intermesh in operative engagement with the slip nut grooves. A pair of nut housings each have a central hole therethrough. One of the nut housings receives the head end drive screw through its central hole and one of the nut housings receives the foot end drive screw through its central hole. Each nut housing has a threaded side hole which receives a set screw. Connecting means for connecting the nut housings to the mattress portions are effective for causing movement of the planar mattress portion in response to movement of the nut housings. A spring is associated with each pressure plate. Each of the springs is compressively received between the outer surface of one of the pressure plates and of one of the set screws. The springs are effective to force the pressure plates against the slip nut to frictionally resist relative motion between the pressure plates and the slip nut. The frictional resistance is less than the shear strength of a drive screw pin or a slip nut pin or the shear strength of the threads on the threaded drive screw and the slip nut.

According to another aspect of the invention, a method of synchronizing the movement of nut housings along a threaded drive screw of an adjustable bed, the bed comprising a head end, a foot end, a mattress-bearing portion, and a screw drive assembly in each head end and foot end, the drive screw assembly comprising a drive screw, a nut housing, a slip nut, a pressure plate, a spring, and a set screw, the method comprising setting the set screws so that the frictional force resisting movement between the pressure plate and the slip nut is less than the force necessary to deform a drive screw pin or the threads on the drive screw or the slip nut, selecting a head end with an associated drive screw assembly, selecting a foot end with an associated drive screw assembly, rotating both drive screws in the same direction and translating a first slip nut associated with a first drive screw assembly until the first slip nut reaches an end of the first drive screw, engaging a first drive screw pin mounted on the rotating first drive screw with a first slip nut pin fixedly mounted on the non-rotating, translating first slip nut, continuing to rotate both drive screws, thereby causing the first slip nut to rotate with the first drive screw through the engagement of the first drive screw and the first slip nut pin, until a second slip nut associated with a second drive screw assembly reaches an end of a second drive screw.

According to another aspect of the present invention, an apparatus for preventing a threaded member from stripping a threaded drive screw comprises a threaded drive screw having a screw pin extending outwardly therefrom. A slip nut has a threaded hole therethrough. The threaded hole in the slip nut is in cooperative association with the threaded drive screw and receives the drive screw therethrough. The slip nut has slip nut grooves cut into an exterior surface. The slip nut has a slip nut pin fixedly attached to and extending from an end of the slip nut. A pressure plate has pressure plate grooves cut into a first surface. The pressure plate grooves are in cooperative association with the slip nut grooves. A nut housing has a hole therethrough. The drive screw, slip nut, and pressure plate are received within the hole. A spring has a first and second end. The first end of the spring is adjacent a second surface of the pressure plate. The second surface of the pressure plate is opposite the first surface of the pressure plate. The second end of the spring is adjacent an interior surface of the nut housing. The spring is operative to force the pressure plate against the slip nut.

One advantage of the present invention is that it provides the capability to utilize head ends and foot ends in a single bed assembly, the drive screw assembly in the head end and foot end not having to be synchronized before assembly.

Another advantage of the present invention is the ability of the mechanism to synchronize each head end and foot end drive screw assembly by running each drive screw until the nut housing and components therein reach the top or bottom of the respective drive screw.

Yet another advantage of the present invention is the ability of the drive screw mechanism to raise and lower the bed without stripping the gears of the motor gear train or the threads of the drive screw.

Still other benefits and advantages of the present invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 2A is an enlarged front elevational view in partial cross-section of one embodiment of the invention;

FIG. 2B is a side elevational view taken along line 2B—2B of FIG. 2A;

FIG. 5 is a top plan view of one embodiment of the invention;

FIG. 6 is a cross-sectional view of the embodiment of the invention shown in FIG. 5 taken along line 6—6 of FIG. 5.

DESCRIPTION OF THE PREFERRED EMBODIMENT

Figure 1:
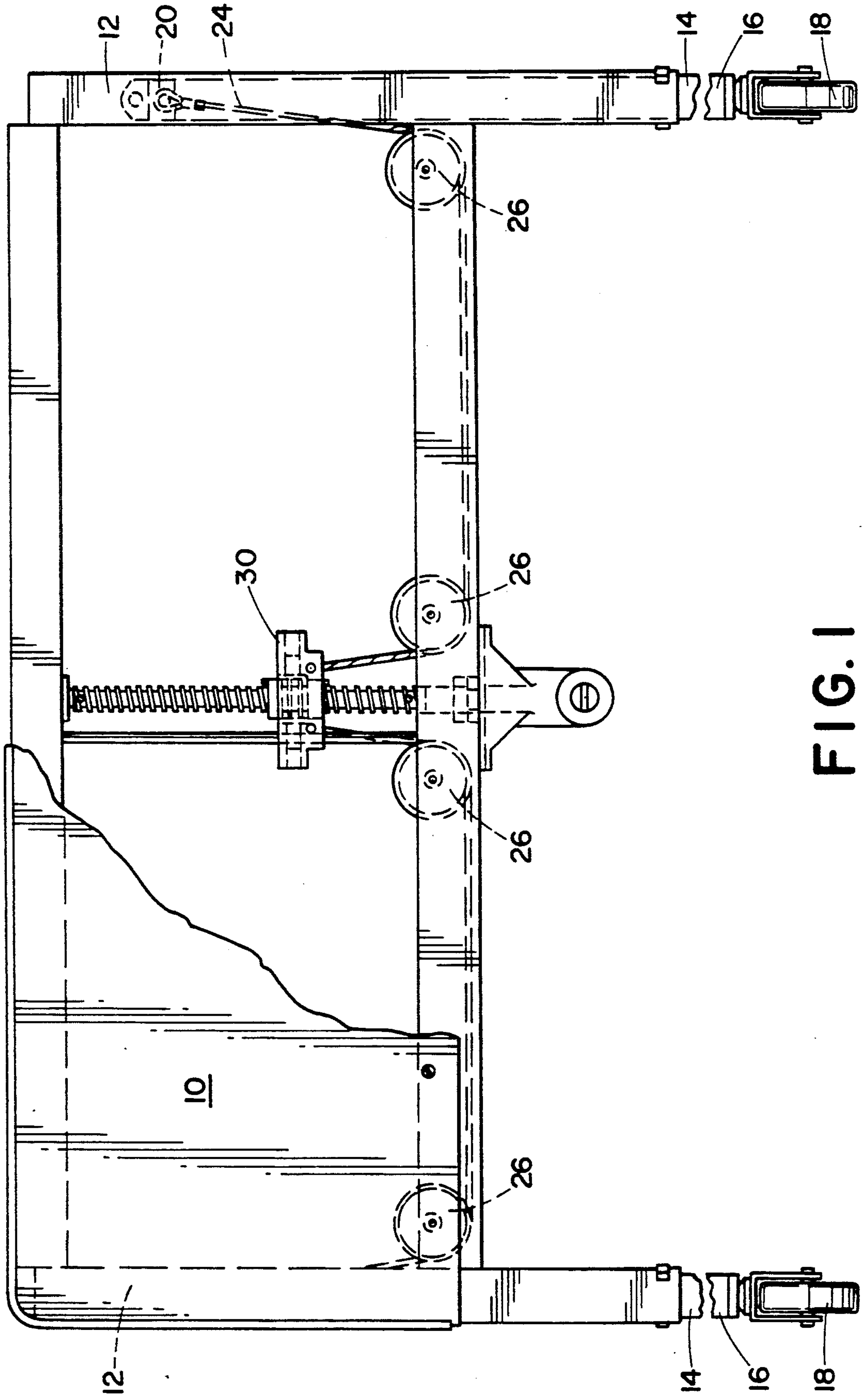
FIG. 1 is a front elevational view in partial cross-section of a foot end or head end incorporating the invention.

Referring now to the drawings, where the showings are for purposes of illustrating a preferred embodiment of the invention and should not be construed as limiting the invention, FIG. 1 shows a head end 10 such as is commonly found in adjustable beds. Parallel to the head end 10 would be an identical or similar foot end (not shown). Suspended therebetween would be a planar mattress portion (not shown) which typically receives a mattress and bedding and eventually supports a person's body thereupon. Because the operation and structure of the invention is identical in the head end 10 as well as the associated foot end, only the operation of the head end 10 will be shown. It should be understood that the operation of the invention within a foot end is identical to that of the head end 10.

The head end 10, along with the foot end and planar mattress receiving portion, make up the frame of a typical adjustable bed. In some adjustable beds, the height of the bed is adjustable through means of a hand crank (not shown) or an electric motor (not shown).

Figure 3:
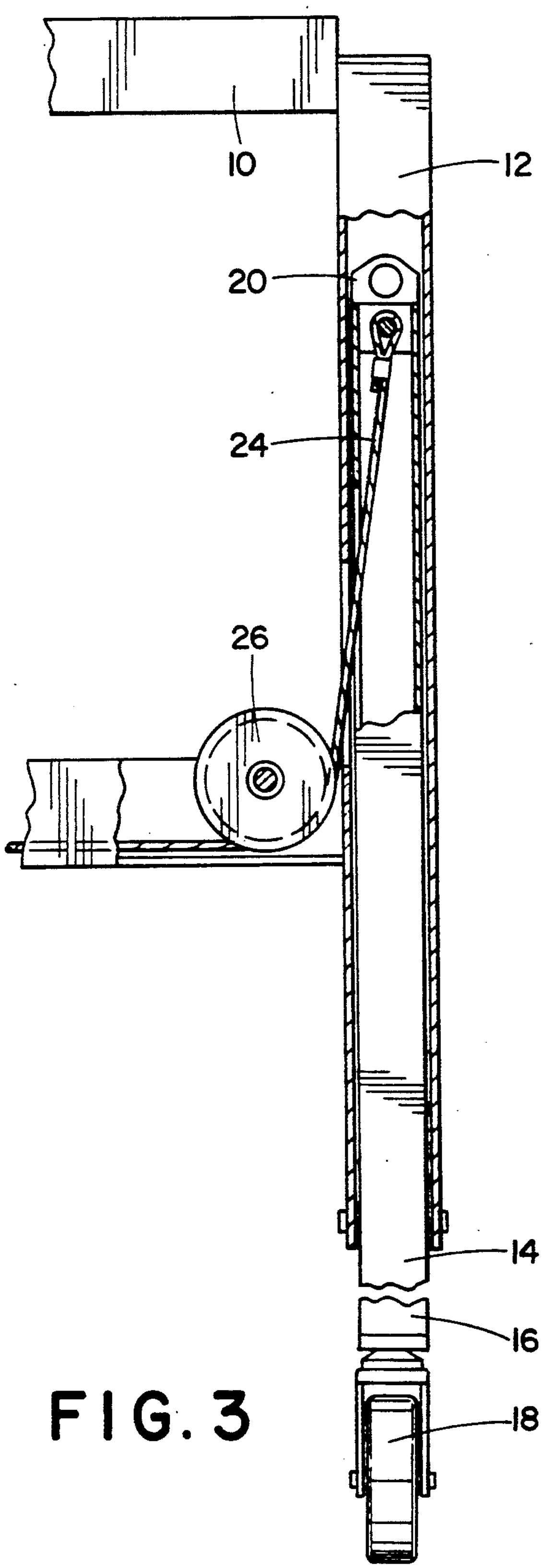
FIG. 3 is an enlarged front elevational view in partial cross-section of a portion of a head end or foot end and tubular leg according to the invention.
Figure 4:
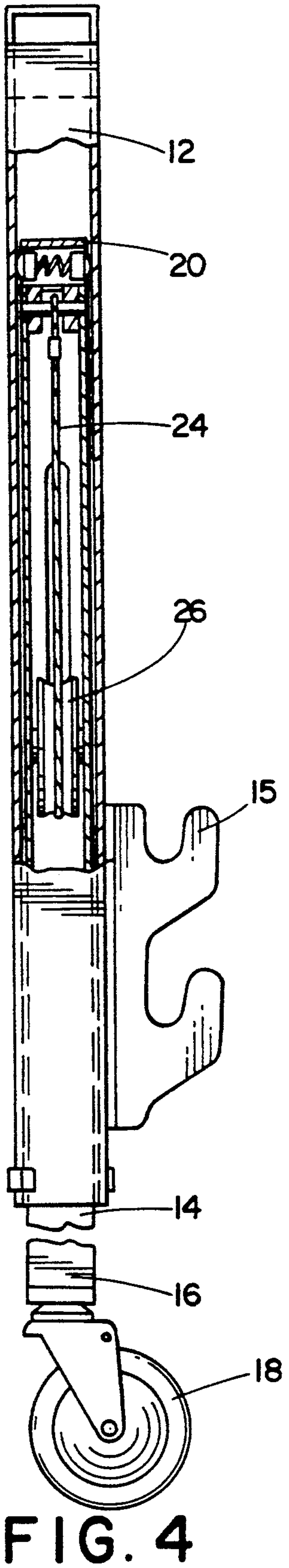
FIG. 4 is a side elevational view in partial cross-section of a head end or foot end and tubular leg according to the invention.

With reference to FIG. 1, FIG. 3, and FIG. 4, the height of the bed is adjustable by means of front legs 12 which are attached to either end of the head end 10. On the foot end, a pair of rear legs similar to the front legs 12 depend downwardly from the foot end. A bracket 15 is fixedly mounted on each leg and is adapted to selectably support the mattress-bearing portion.

Slidingly received within the downwardly depending front legs 12 are front tubes 14. Attached to the bottom end 16 of the front tubes 14 is preferably a caster 18 Attached to the top end 20 of the front tube 14 is a cable 24. The cable 24 extends from the top end 20 of the front tube 14, over a pair of pulleys 26, to a nut housing 30.

With reference to FIGS. 2A and 2B, the nut housing 30 is translated up and down a drive screw 32 by its rotation. The rotation of the drive screw 32 may be effected by means of a hand crank (not shown), an electric motor (not shown), or other conventional arrangement. In one embodiment, rotary motion is transferred to the drive screw 32 by means of miter gears 34. Fixedly mounted on the drive screw 32 is an upper screw pin 38 and a lower screw pin 40.

With reference to FIGS. 5 and 6, a slip nut 44 is received within a hole 46 within the nut housing 30. Fixedly mounted to the top end 48 of the slip nut 44 is an upper slip nut pin 50. Fixedly mounted to the lower end 52 of the slip nut 44 is a lower slip nut pin 54. In the preferred embodiment, the slip nut 44 is made of bronze. The slip nut 44 has a threaded hole 45 therethrough which is operatively associated with the threads of the drive screw 32, such that upon rotation of the drive screw 32, the slip nut 44 translates along the axis of the drive screw 32. The outer surface of the slip nut 44 features slip nut grooves 58 cut therein. The slip nut grooves 58 are not helically extending about the outer surface of the slip nut 44, but rather are perpendicular to the longitudinal axis of the slip nut 44.

A pair of pressure plates 66 feature pressure plate grooves 68 cut into an interior surface. The pressure plate grooves 68 intermeshingly cooperate with the slip nut grooves 58 so that the pressure plates may selectably rotate within the slip nut grooves 58.

A spring 70 is associated with each pressure plate 66. One end of the spring is adjacent the outer surface 72 of a pressure plate 66 and the other end of the spring is adjacent a set screw 76. The set screw 76 is threadedly received within a hole 78 in the nut housing 30.

The operation of the invention will now be described. It is a common occurrence in the use of an adjustable bed, for example in hospital or home rental use of beds, for an adjustable bed to be disassembled and stored for a period of time. During such storage, frequently a head end of one bed is matched with a foot end of another bed. In this case, it is common for the nut housing 30 to be at a different position along the drive screw 32 in the head end 10 than might be true in the foot end. When such a head end 10 and foot end are assembled and the bed is either lowered or raised to one extreme, the nut housing and associated assembly will reach the end of a drive screw 32 prior to the assembly at the other end of the bed. In such case, the gears of the motor gear train were often stripped due to the power of the electric motor. The invention described herein provides a method of avoiding such stripping of gears while providing a way to synchronize the location of the nut housing 30 and associated parts via mechanical means.

Each drive screw 32 in the head end 10 and foot end are rotated until one of the slip nut pins 50, 54 contacts one of the drive screw pins 38, 40. When a drive screw pin contacts a slip nut pin, the slip nut 44 is forced to rotate together with the drive screw 32 due to the rotative force applied to the slip nut 44 through the pins. Because the slip nut grooves 58 and pressure plate grooves 68 are parallel grooves extending about the periphery of the slip nut 44, the pressure plates 66 slide within the slip nut grooves 58. In this way, the gears of the motor gear train are not damaged as they rotate until the corresponding nut housing 30 at the other end of the bed also reaches the same extreme position, whether it be top or bottom.

In order for the assembly shown in FIGS. 5 and 6 to operate in this manner, the frictional force between the pressure plates 66 and the slip nut 44 which resists rotational movement between the pressure plates 66 and the slip nut 44 must be set so that it is less than the force required to shear the drive screw pins 38, 40, or the slip nut pins 50, 54, or the gears of the motor gear train. This frictional force is adjustable by means of springs 70. The compressive force of the springs is adjustable by means of set screw 76. In the preferred embodiment, the spring 70 is made of 0.078 in. diameter music wire and has a spring constant of 241.8 lbs./inch. The preferred spring has 5.5 active coils and 7.5 total coils. The adjustment procedure for springs of the preferred embodiment requires that the set screw 76 be adjusted so that the spring 70 is completely compressed. At this point, the set screw 76 is withdrawn one half turn. In addition, a lubricant is applied to the interface of the pressure plate grooves 68 and the slip nut grooves 58. The preferred lubricant is sold under the tradename "NYOGEL®". Preferably, the "NYOGEL®" lubricant should be applied between the pressure plate 66 and slip nut 44. A second preferred lubricant, "LUBRIPLATE® #1242", should preferably be applied between the screw threads and slip nut 44.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed to be:

1. An adjustable bed comprising:

a head end supported by head end legs;

a foot end supported by foot end legs;

a planar mattress-bearing portion extending between and supported by said head end and foot end;

a head end drive screw and a foot end drive screw, said head end drive screw being vertically disposed within said head end and said foot end drive screw vertically disposed within said foot end, said drive screws having threads and being selectably rotatable, each drive screw having an upper and lower end, each drive screw having an upper drive screw pin fixedly attached near said upper end and a lower drive screw pin fixedly attached near said lower end;

an annular slip nut associated with each of said drive screws, each slip nut having an interior surface and an exterior surface, each of said interior surfaces having slip nut threads which operatively engage said drive screw threads, each of said exterior surfaces having slip nut grooves therein, each of said slip nuts having an upper and lower end, an upper slip nut pin being fixedly attached to each upper end of each of said slip nuts and a lower slip nut pin fixedly attached to each lower end of each of said slip nuts;

a pressure plate associated with each of said slip nuts, said pressure plates having inward and outward surfaces, said inward surfaces having pressure plate grooves therein, said pressure plate grooves in intermeshing operative engagement with said slip nut grooves;

a pair of nut housings, each nut housing having a central hole therethrough, each of said nut housings receiving one of said drive screws, slip nuts, and pressure plates through its central hole, each nut housing having a threaded side hole which receives a set screw;

connecting means for connecting said nut housings to said planar mattress-bearing portion; said connecting means effective for causing movement of said planar mattress-bearing portion in response to movement of said nut housings; and, a spring associated with each pressure plate, each of said springs compressively received between said outward surface of one of said pressure plates and one of said set screws, said springs effective to force said pressure plates against said slip nut to frictionally resist relative motion between said pressure plate and said slip nut.

2. The bed of claim 1 wherein said frictional resistance is less than a shear strength of said drive screw pins and said slip nut pins.

3. The bed of claim 1 wherein said frictional resistance is less than the force necessary to strip associated motor gear train gear teeth.

4. The bed of claim 1 wherein the frictional resistance is adjustable via said set screw.

5. The bed of claim 1 wherein translational movement of one of said nut housings along a longitudinal axis of one of said drive screws ceases, and rotational movement of one of said slip nuts with said one of said drive screws commences, when one of said drive screw pins contacts one of said slip nut pins.

6. A bed whose height is adjustable, said bed comprising:

a frame having first and second ends;

a head end attached to said first end of said frame, said head end having a pair of downwardly depending front tubes;

a foot end attached to said second end of said frame, said foot end having a pair of downwardly depending rear tubes;

a pair of front legs, one of each of said front legs slidingly received within one of said downwardly depending front tubes;

a pair of rear legs, one of each of said rear legs slidingly received within said one of said downwardly depending rear tubes;

a motor;

front and rear drive screws, each of said front and rear drive screws having an upper and a lower end;

means to translate power from said motor to said front and rear drive screws;

upper and lower screw pins, one of said upper screw pins fixedly attached near each of said upper ends of said front and rear drive screws and one of said lower screw pins fixedly attached near each of said lower ends of said front and rear drive screws;

front and rear nut housings, said front nut housing received on said front drive screw, said rear nut housing received on said rear drive screw;

a pair of slip nuts, one of said slip nuts disposed within each of said nut housings, each slip nut having a top end and a bottom end, said slip nuts having slip nut grooves in their exterior surfaces;

upper and lower slip nut pins, one of said upper slip nut pins fixedly attached near each of said top ends of said slip nuts and one of said lower slip nut pins fixedly attached near said lower ends of said slip nuts;

a pair of pressure plates associated with each of said slip nuts, each of said pressure plates having pressure plate grooves in an inward surface which cooperate with said, slip nut grooves in said exterior surface of said slip nuts;

springs, one of said springs operatively associated with each of said pressure plates, said one of said springs compressingly engaging an outer surface of one of said pressure plates and compressing said pressure plate grooves in said pressure plate into cooperative engagement with said slip nut grooves in said exterior of said slip nut, said springs generating a frictional force resisting relative movement between said slip nuts and said pressure plates, said frictional force being less than the force required to deform said slip nut pins and drive screw pins;

a pair of front cables, each of said front cables having a first end and a second end, said first end of one of said front cables attached to one of said front legs and said first end of the other front cable attached to the other of said front legs, each second end of each of said nut cables fixedly attached to said nut housing;

a pair of rear cables, each of said rear cables having a first end and a second end, said first end of one of said rear cables attached to one of said rear legs and said first end of the other rear cable attached to the other of said rear legs, each said second end of said rear cables fixedly attached to said nut housing;

at least one pulley associated with nut front and rear cable, said pulley cooperating with one of said cables, whereby, when said motor and translating means cause said front and rear drive screws to turn, said front and rear nut housings translate along said front and rear drive screws, said translation effective to translate said front and rear legs within said front and rear tubes and thereby adjust the height of said bed.

7. The bed of claim 6, further comprising:

a set screw received in a side hole in each of said nut housings, said set screw operative to adjust said frictional force resisting relative movement between said slip nuts and said pressure plates.

8. A method of synchronizing the movement of nut housings along threaded drive screws of an adjustable bed, said bed comprising a head end, a foot end, a mattress-bearing portion, and a drive screw assembly in each head end and foot end, said drive screw assembly comprising a drive screw, a nut housing, a slip nut, a pressure plate, a spring, and a set screw, said method comprising:

setting said set screws so that the frictional force resisting movement between said pressure plate and said slip nut is less than the force necessary to deform a drive screw pin or said threaded drive screw;

selecting a head end with an associated drive screw assembly;

selecting a foot end with associated drive screw assembly;

rotating both drive screws in the same direction and translating a first slip nut associated with a first drive screw assembly until said first slip nut reaches an end of said first drive screw;

engaging a first drive screw pin mounted on said rotating first drive screw with a first slip nut pin fixedly mounted on said non-rotating, translating first sleeve;

continuing to rotate both drive screws, thereby causing said first slip nut to rotate with said first drive screw through said engagement of said first drive screw and first slip nut pins, until a second slip nut associated with a second drive screw assembly reaches an end of a second drive screw.

9. A method of translating a nut housing along a threaded drive screw of an adjustable height bed, said bed comprising a drive screw, a slip nut, a pressure plate, a spring, a nut housing, a set screw, a drive screw pin, and a slip nut pin, said method comprising:

setting said set screw so that the frictional force resisting movement between said pressure plate and said slip nut is less than the shear force necessary to deform one of said pins or said drive screw;

rotating said drive screw;

translating said nut housing, slip nut, pressure plate, spring, and set screw along said drive screw via threaded engagement with threads on said rotating drive screw;

engaging a drive screw pin fixedly mounted on said rotating drive screw with slip nut pin fixedly mounted on said non-rotating, translating slip nut;

rotating said slip nut within said nut housing by engagement of said drive screw pin and said slip nut pin, said rotation overcoming said frictional force between said pressure plate and said slip nut and halting translation of said nut housing along said threaded drive screw.

10. An apparatus for preventing a threaded member from stripping an associated gear, said apparatus comprising:

a threaded drive screw, said threaded drive screw having a screw pin extending outwardly from said drive screw;

a slip nut having a threaded hole therethrough, said threaded hole in threaded cooperative association with said threaded drive screw and receiving said drive screw therethrough, said slip nut having slip nut grooves cut into an exterior surface, said slip nut having a slip nut pin fixedly attached to and extending from an end of said slip nut;

a pressure plate having pressure plate grooves cut into a first surface, said pressure plate grooves in cooperative association with said slip nut grooves;

a nut housing having a hole therethrough, said drive screw, slip nut, and pressure plate received within said hole; and, a spring, said spring having a first and second end, said first end adjacent a second surface of said pressure plate, said second surface being opposite said first surface, said second end adjacent an interior surface of said nut housing, said spring operative to force said pressure plate against said slip nut.

11. The apparatus of claim 10 further comprising:

a set screw threadedly received within said nut housing, a first end of said set screw adjacent said second end of said spring, said set screw positioned to compress said spring an amount so that the frictional force between said pressure plate and said slip nut is less than the force necessary to strip gears of an associated motor gear drive train.

12. The apparatus of claim 11 wherein said slip nut is made of bronze.

13. The apparatus of claim 11 wherein said slip nut pin selectively engages said screw pin, said engagement effective to cause rotation of said slip nut relative to said nut housing.

14. An apparatus for providing translational movement of a nut housing along a threaded rod without stripping, said apparatus comprising:

a threaded rod having a first stop near one end, said first stop extending outwardly from said rod in a direction perpendicular to a longitudinal axis of said rod;

a cylindrical follower having threads cut into an interior surface and follower grooves cut into an exterior surface, said threads in operative engagement with said threaded rod, said cylindrical follower translated along said longitudinal axis of said rod upon the rotation of said rod about said longitudinal axis, said follower having a second stop fixedly mounted on an end of said follower, said second stop selectably contacting said first stop and thereby ceasing translational motion along said longitudinal axis and beginning rotational movement about said longitudinal axis;

a pair of opposed pressure plates, each pressure plate having pressure plate grooves cut into an inward surface, said pressure plate grooves in intermeshed operative engagement with said follower grooves;

a nut housing, said nut housing having a central hole therethrough, said threaded rod, follower, and pressure plates received within said central hole, said nut housing also having a pair of threaded set screw holes on opposite sides of said central hole and in communication therewith, a set screw threadedly received within each of the set screw holes; and, a pair of springs, each spring being compressively received between an exterior surface of one of said pressure plates and one of said set screws, the springs operative to force said pressure plates against said follower to prevent relative motion between said nut housing and said slip nut at torque levels below the shear strength of threads on said follower and said rod.

* * * * *